(12) United States Patent
Haas

(10) Patent No.: US 11,536,566 B2
(45) Date of Patent: Dec. 27, 2022

(54) LEVELING TOOL

(71) Applicant: Corey Haas, Morris, IL (US)

(72) Inventor: Corey Haas, Morris, IL (US)

( * ) Notice: Subject to any disclaimer, the term of this patent is extended or adjusted under 35 U.S.C. 154(b) by 60 days.

(21) Appl. No.: 17/333,306

(22) Filed: May 28, 2021

(65) Prior Publication Data
US 2022/0381560 A1    Dec. 1, 2022

(51) Int. Cl.
    *G01C 9/28*        (2006.01)
    *H02G 1/06*        (2006.01)

(52) U.S. Cl.
    CPC   *G01C 9/28* (2013.01); *H02G 1/06* (2013.01)

(58) Field of Classification Search
    CPC .......................................................... G01C 9/28
    USPC ............................................. 33/347, 370–373
    See application file for complete search history.

(56) References Cited

U.S. PATENT DOCUMENTS

| | | | | |
|---|---|---|---|---|
| 6,173,502 B1 * | 1/2001 | Scarborough | ............ | G01C 9/28 33/DIG. 1 |
| 6,532,676 B2 * | 3/2003 | Cunningham | ....... | G01C 15/008 33/286 |
| 6,834,435 B2 * | 12/2004 | Turner | ...................... | G01C 9/28 33/529 |
| 7,536,798 B2 * | 5/2009 | Silberberg | ............... | G01C 9/34 33/379 |
| 7,562,462 B2 * | 7/2009 | Gentleman | ............... | G01C 9/28 33/372 |
| 7,913,406 B2 * | 3/2011 | Norelli | ...................... | G01C 9/28 33/DIG. 1 |
| 8,484,856 B1 * | 7/2013 | Webb | ........................ | G01C 9/28 33/373 |
| 9,151,606 B2 * | 10/2015 | Silberberg | ............... | G01C 9/28 |
| 9,551,574 B2 * | 1/2017 | Silberberg | ............... | G01C 9/28 |
| 9,885,571 B2 * | 2/2018 | Hoppe | ...................... | G01C 9/34 |

* cited by examiner

*Primary Examiner* — George B Bennett

(57) ABSTRACT

A leveling tool configured to be releasably attached to a pipe includes a level carried by a main body and a pair of first and second articulating arms extending from the main body. One or more magnets are carried by the arms. Each of the first and second arms is configured articulate so as wrap at least part way around a pipe. The first and second magnets are configured to releasably attach the first and second arms to the pipe.

18 Claims, 4 Drawing Sheets

LEVELING TOOL

FIELD

This application relates generally to a leveling tool, and more particularly to a leveling tool that can be easily attached to a conduit, pipe, bar, or other shape of workpiece to help an operator orient the workpiece in a desired orientation.

BACKGROUND

Pipes, such as conduit for electrical wiring, often need to be bent in multiple locations. Sometimes, when the pipe is bent, all the sections of the pipe must be co-planar. For example, electrical conduit may need to be bent at two or more locations to form an offset, saddle, or other shape, and still be able to lay flat against a wall or ceiling. However, pipe bending machines used to make these pipe bends typically do not have a guide that would help the operator ensure that all of the bends are oriented such that the pipe sections are co-planar. In order to accomplish this, a leveling tool can be used to help the operator ensure that the pipe sections are co-planar. FIG. 1 shows a known conduit offset leveling tool 10 that is designed to be attached to a conduit to help the operator ensure that bends in the conduit are oriented so that the conduit sections are co-planar after being bent. The leveling tool 10 includes a bubble level 12 and a pair of spaced apart arms 14 that can receive the end of a conduit sidewall. A clamp screw 16 through one of the arms is used to secure the leveling tool 10 to the conduit sidewall by clamping the conduit between the set screw and the opposing arm.

SUMMARY

A leveling tool according to the present disclosure has an adjustable coupling arrangement that provides an easy way to releasably attach the leveling tool to a wide range of sizes and shapes of pipes, bars, tubes, or other shaped work piece.

According to some aspects, a leveling tool configured to be releasably attached to a pipe may include a level carried by a main body. A first articulating arm may extend from the main body. A second articulating arm may extend from the main body. A first magnet may be carried by the first articulating arm. A second magnet may be carried by the second articulating arm. Each of the first articulating arm and the second articulating arm may articulate so as to be able to wrap at least part way around a pipe. The first and second magnets may be configured to releasably couple the first and second articulating arms to the pipe.

According some aspects, a leveling tool may include a main body, a level carried by the main body, a first articulating arm extending from the body in a first direction, and a second articulating arm extending from the body in a second direction. The first articulating arm may include a first intermediate link connected to the main body by a first articulating joint and a first end link. The second articulating arm may include a second intermediate link connected to the main body by a first articulating joint and a second end link. A first magnet may be carried by the first articulating arm. A second magnet may be carried by the second articulating arm. A third magnet may be carried by the main body.

In some arrangements, the first articulating arm may be joined to the main body at a first articulating joint. The second articulating arm may be joined to the main body at a second articulating joint.

In some arrangements, the level may include a bubble level. The bubble level may extend along an axis away from a top surface of the main body. The level may include a digital level and/or different type of analog level.

In some arrangements, one or both of the first and second articulating arms may include a plurality of links articulatingly joined together. The links may include at least one intermediate link articulatingly joined to the main body and an end link. The end link may be articulatingly joined to the intermediate link. Articulating joints may be formed by any articulating joint arrangement, such as pin hinges, living hinges, flexible material hinges, and ball-and-socket joints. Additional intermediate links may be articulatingly disposed between the at least one intermediate link and the end link.

In some arrangements, a magnet may be carried by one or more or each of the links. A magnet may be carried by the main body. One or both end links may two magnets or more than two magnets. Any of the links and/or main body may carry more than one magnet, and/or some links and/or the main body may not carry a magnet.

In some arrangements, a look-through protective cover may at least partly surround the level. The look-through protective cover may include a cage surrounding the level and defining one or more windows through which the level may be viewed. The look-through protective cover may include a solid transparent encasement made of resin, plastic, glass, or similar transparent, protective material.

These and other aspects, arrangements, features, and/or technical effects will become apparent upon inspection of the following detailed description and of the figures.

DETAILED DESCRIPTION

Figure 1:
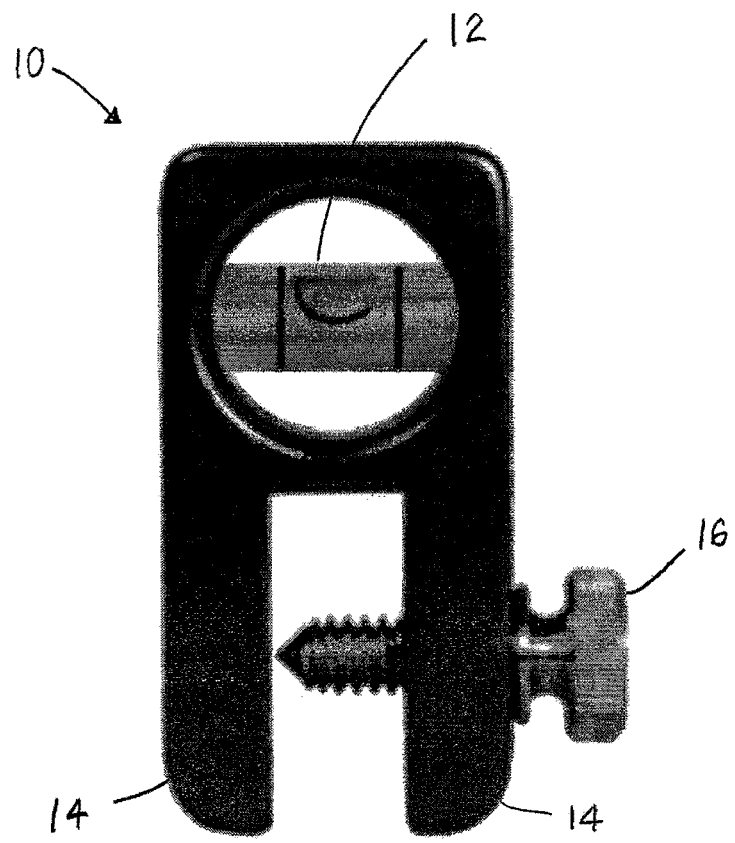
FIG. 1 is an elevation view of a prior art conduit offset leveling tool.
Figure 2:
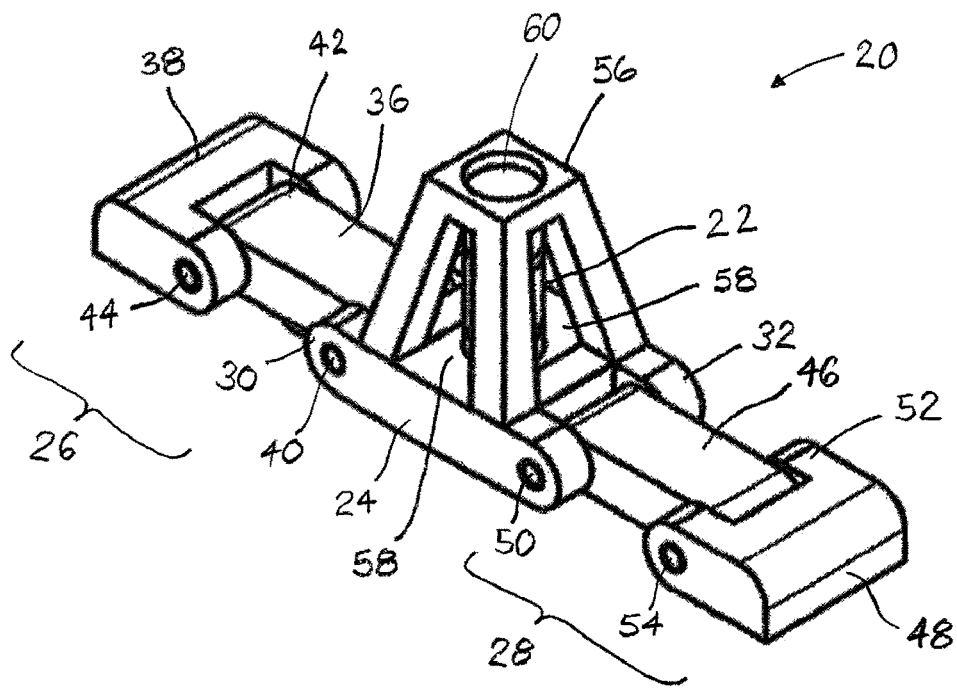
FIG. 2 is a top isometric view of a leveling tool of the present invention.
Figure 3:
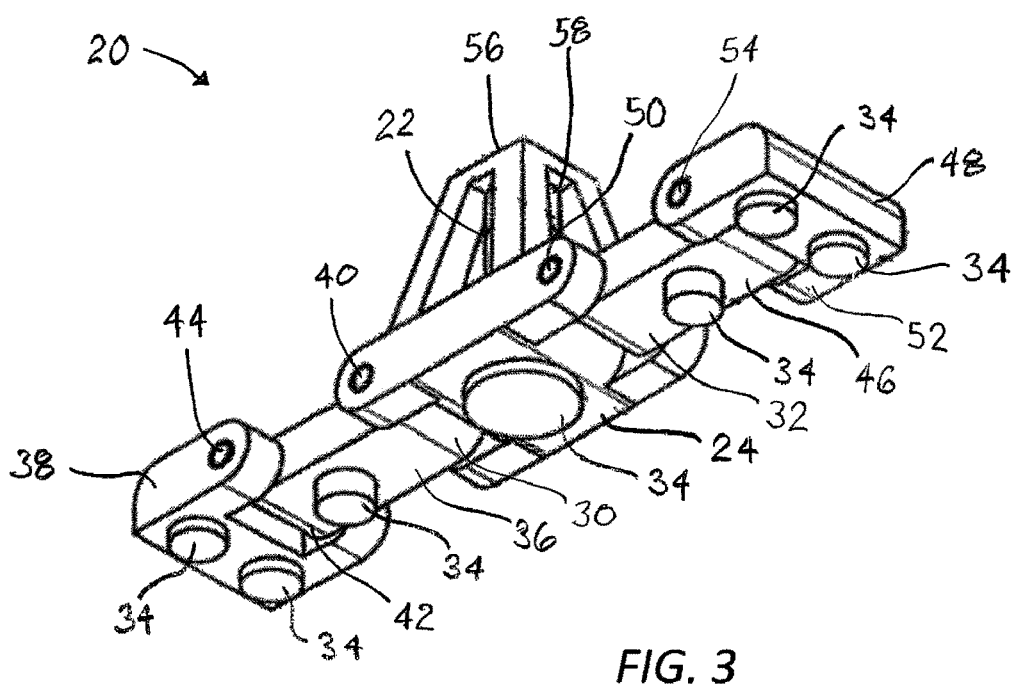
FIG. 3 is bottom isometric view of the leveling tool of FIG. 2.

Turning now to the exemplary embodiments depicted in the drawings, FIGS. 2 and 3 show a leveling tool 20 in one exemplary arrangement in accordance with the present invention. The leveling tool 20 includes a level 22 carried by a main body 24 and a pair of articulating arms, including a first articulating arm 26 and a second articulating arm 28. Each of the first articulating arm 26 and the second articulating arm 28 is configured to articulate so as to be able to wrap at least partly around the outer surface of a pipe, bar, rod, or other similarly shaped workpiece. In this exemplary arrangement, the first and second articulating arms 26, 28 extend from opposite left and right sides of the main body 24, respectively. The first articulating arm 26 is articulably connected to the left side of the main body with a first articulating joint 30. The second articulating arm 28 is articulably connected to the right side of the main body 24 with a second articulating joint 32. The articulating joints 30, 32 may be formed in any manner suitable to allow the arms 26, 28 to articulate relative to the main body 24 and level 22, such as with a pinned hinge, a living hinge, a flexible material such as cloth, a ball-and-socket joint, and/or any other suitable joint capable of allowing the articulating arms 26, 28 to articulate.

One or more magnets 34 is carried by each of the first and second articulating arms 26, 28 and are adapted to releasably secure the leveling tool 22 the exterior surface of a workpiece. Preferably, the magnets 34 are disposed on bottom surfaces of the first and second arms 26, 28, and the level 22 is disposed on a top surface of the main body 24 so that the level 22 is visible to the user when the magnets 34 on the bottom surfaces of the first and second arms 26, 28 are releasably secured to and facing a workpiece. In some arrangements, one or more of the magnets 34 may be housed in whole or in part within one or more of the articulating arms 26, 28 and/or the main body 24.

Each of the first articulating arm 26 and the second articulating arm 28 may be formed by one or more links. In the present arrangement, each of the first articulating arm 26 and the second articulating arm 28 is formed by two links. The first articulating arm 26 includes a first intermediate link 36 and a first end link 38. A proximal end of the first intermediate link 36 is rotatably connected to the left side of the main body 24, for example with a first pin 40. A distal end of the first intermediate link 36 is rotatably connected to a proximal end of the first end link 38 at a third articulable joint 42, for example with a second pin 44. In similar manner, the second articulating arm 28 includes a second intermediate link 46 and a second end link 48. A proximal end of the second intermediate link 46 is rotatably connected to the right side of the main body 24 at the second articulable joint 32, for example with a third pin 50. A distal end of the second intermediate link 46 is rotatably connected to a proximal end of the second end link 48 at a fourth articulable joint 52, for example with a fourth pin 54. Preferably, each of the main body 24 and the links 36, 38, 46, 48 is suitably sized for use with various electrical conduit sizes and pipe sizes. For example, in one arrangement, each of the main body 24 and the links 36, 38, 46, 48 has a length between approximately 10 mm and 100 mm, a width between approximately 10 mm and 50 mm, and thickness between approximately 1 cm and 40 cm. However, larger or smaller sizes may be used, for example to be suitable for use with larger or smaller sized pipe. Also, either or both of the first and second arms may be formed by a single link or by more than two links. In the present example, the main body 24 and the links 36, 38, 46, 48 may have flat, i.e., planar, top and bottom surfaces and may be made of a stiff material, such as metal or hard plastic. However, the links are not limited to a specific size or shape or material.

As best seen in FIG. 3, at least one magnet 34 may be carried by the each of the main body 24 and the links 36, 38, 46, 48 such that each of the main body 24 and the links can independently couple to the exterior surface of a workpiece. In this arrangement, a first magnet 34 is disposed on the bottom side of the first intermediate link 36, and a second magnet 34 is disposed on the bottom side of the second intermediate link 46. In addition, a third magnet is disposed on the bottom side of the main body 24. Furthermore, at least one, and in this case two magnets 34 are disposed on the bottom side of each of the first end link 38 and the second end link 48. In this example, each of the magnets 34 is disposed on and extends outwardly from the bottom surface of the respective main body 24 and links 36, 38, 46, 48. In other arrangements, however, the magnets could be recessed into the bottom surfaces of any one or more of the main body 24 and links 36, 38, 46, 48 and/or may be housed inside the main body and/or links. Other arrangements and/or numbers of the magnets 34 may also be used, so long as the magnets 34 are able to sufficiently releasably attach the leveling tool 20 to the exterior surface of a workpiece.

Figure 4:
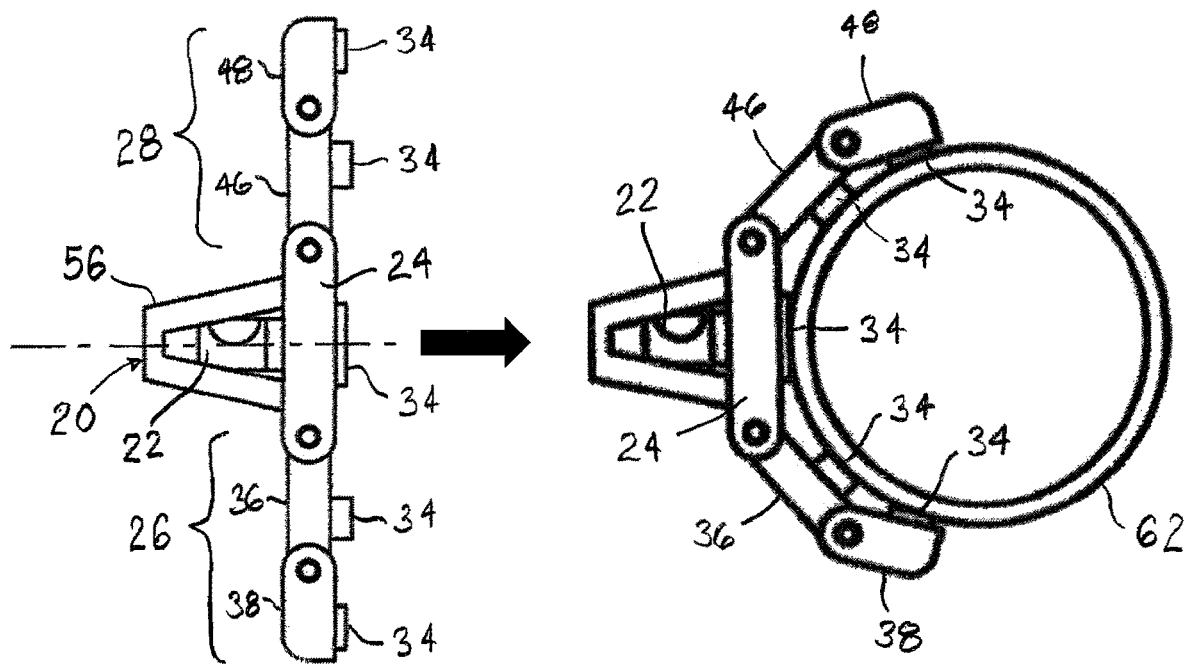
FIG. 4 is a side elevation view of the leveling tool of FIG. 2 being releasably attached to a pipe.

The level 22 may be any analog or digital device capable of sensing the local gravitational field and providing a reading capable of being interpreted to define a horizontal plane. In this particular example, the level 22 is a typical bubble level that is adapted to provide a reading of the horizontal plane in a sideways, i.e., horizontally oriented, configuration. The level 22 extends outwardly (upwardly as seen in FIG. 2 and to the left as seen in FIG. 4) from the top surface of the main body 24 along an axis generally perpendicular to the plane of the main body 24. The level reading of an air bubble within a tube can be seen from a sideways orientation, for example when the axis of the level 22 is generally horizontal. Other types and configurations of the level 22 may be used.

A look-through protective cover 56 may be disposed at least partly surrounding the level 22 to protect the level, for example, from being dropped on the floor or being inadvertently hit with other tools. In this arrangement, the look-through protective cover 56 is in the form of a cage having one or more side windows 58 through which a user can read the level in the sideways orientation. Four side windows 58 are disposed around the level at 90° intervals around the axis of the level. An opening 60 may be disposed at the end of the level 22 to allow for insertion of the bubble level. The cage includes four corner posts extending upwardly from the top surface of the main body 24 and an end piece connecting the four posts. Each of the four side windows 58 is defined between adjacent pairs of the posts, and the opening 60 is extends through the end piece. However, other configurations for the cage 56 capable of protecting the level 22 and allowing the operator to read the level may be used. For example, the look-through protective cover 56 may include and/or be formed of a solid transparent encasement made of resin, plastic, glass, or similar transparent, protective material, and may completely surround the level 22. In yet other arrangements, the look-through protective cover 56 may be omitted entirely.

Figure 5:
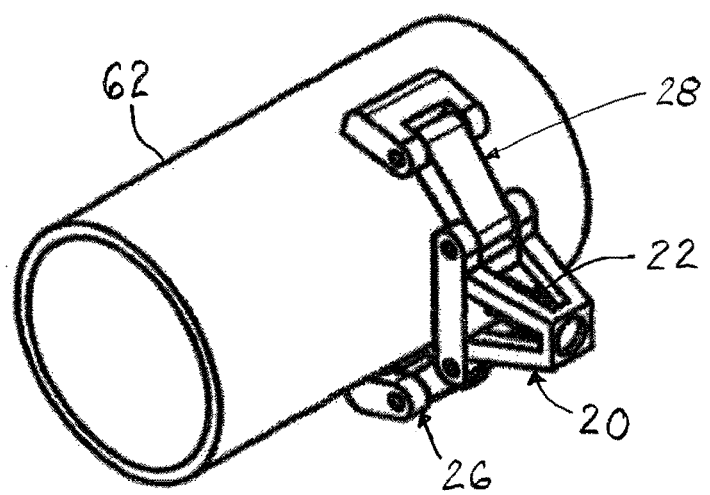
FIG. 5 is an isometric view of the leveling tool attached to the pipe.
Figure 6:
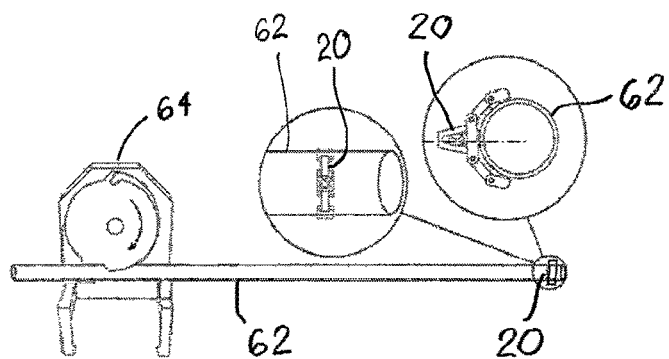
FIG. 6 illustrates a step in a method of using the leveling tool of FIG. 2 to make co-planar bends in a pipe using a pipe bending machine.
Figure 7:
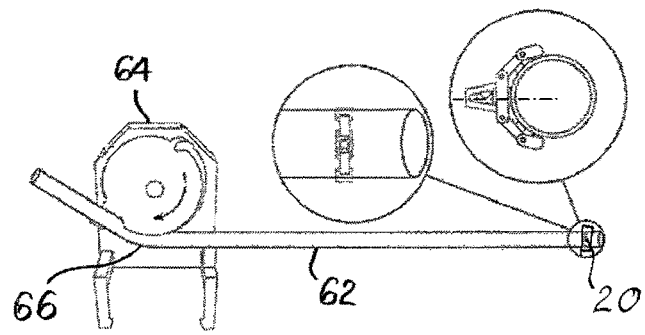
FIG. 7 illustrates another step in a method of using the leveling tool of FIG. 2 to make co-planar bends in a pipe using a pipe bending machine.
Figure 8:
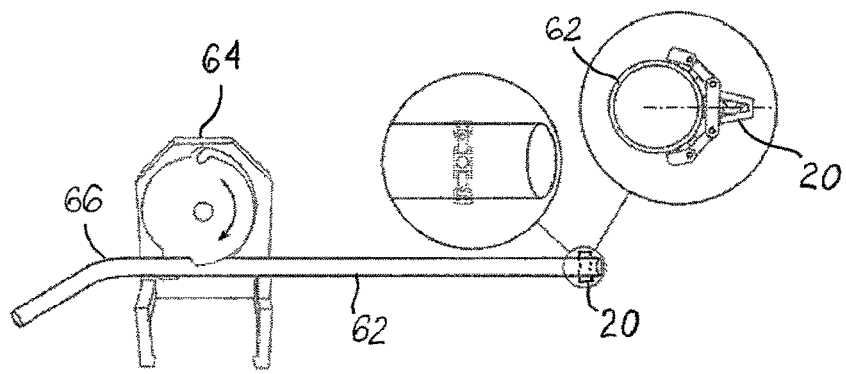
FIG. 8 illustrates another step in a method of using the leveling tool of FIG. 2 to make co-planar bends in a pipe using a pipe bending machine.
Figure 9:
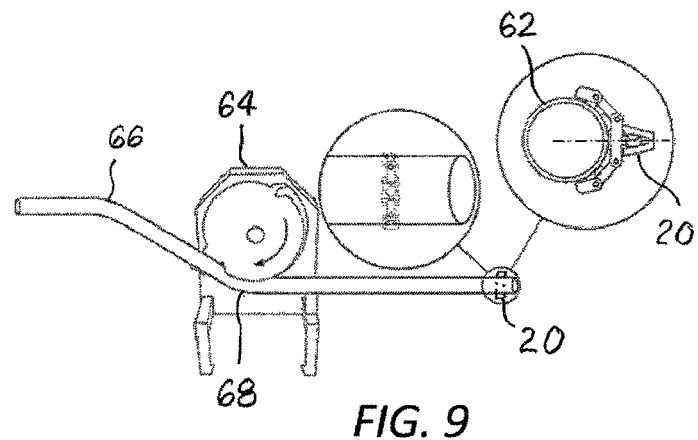
FIG. 9 illustrates another step in a method of using the leveling tool of FIG. 2 to make co-planar bends in a pipe using a pipe bending machine.

FIGS. 4, and 5 show how the leveling tool 20 can be releasably secured to a workpiece, which in this example is a pipe 62 such as an electrical conduit. As seen in FIG. 4, the leveling tool 20 can be secured to the pipe 62 by extending the first and second articulating arms 26, 28 in opposite directions from the main body 24, and then engaging the bottom sides of the main body and the arms against the outer surface of the pipe 62. Each of the first articulating arm 26 in the second articulating arm 28 articulates so that the articulating arms at least partly conform to and/or surround the outer surface of the pipe 62. The magnets 34 on the bottom sides of the main body 24 and the articulating arms 26, 28 releasably attach to the outer surface of the pipe 62, for example by magnetic forces. In this example, the leveling tool 20 is secured to the pipe 62 with the level 22 in a generally horizontal position such that the horizontal plane may be found in the sideways orientation as seen through one of the side windows 58. With the leveling tool 20 so secured to the pipe 62, the pipe may and/or the leveling tool be rotated about the pipe's axis until the level 22 is oriented level with the horizontal. Because of the articulating arms 26, 28 that articulate around the outer surface of the pipe 62 as well as the magnets 34 that releasably attach to the exterior surface of the pipe 62, the leveling tool 20 may be secured to a wide variety of sizes and shapes of pipe because the arms can adjust to different sizes of pipe and do not necessarily have to span the entire circumference or diameter of the pipe. In addition, it may be easier to mount the leveling tool 20 to a workpiece with just one hand because an operator does not need to operate a clamp screw or other secondary securement mechanism.

INDUSTRIAL APPLICABILITY

FIGS. 6-9 illustrate one possible method of using the leveling tool 20 to ensure that a pair of offset bends in the pipe 62 are aligned within a single plane. In a first step, as illustrated diagrammatically in FIG. 6, the pipe 62 in its straight configuration is clamped into a pipe bending machine 64 in a generally horizontal orientation. Next, the leveling tool 20 is secured to the pipe 62 near the end that is not going to be bent by the pipe bending machine 64. The pipe 62 or the leveling tool 20 is then rotated about the pipe's axis until the level 22 is level in a sideways orientation with the axis of the level 22 extending horizontally outwardly away from and to the left side of the pipe 62. In this position, as shown diagrammatically in FIG. 7, a first bend 66 is made in the pipe using the pipe bending machine 64. Thereafter, as shown diagrammatically in FIG. 8, without removing the leveling tool 22 from the pipe 62 or changing the orientation of the leveling tool 22 relative to the pipe 62, the pipe is now advanced in the pipe bending machine 64 to the desired location of a second bend 68, and the pipe 62 is rotated 180° about its axis until the level 22 is extending horizontally outwardly away from and to the right side of the pipe 62, i.e., in the opposite direction as during the first bend. As shown diagrammatically in FIG. 9, with the level 22 again aligned in the same horizontal plane and with the pipe rotated 180°, the second bend 68 is formed in the pipe 62 with the pipe bending machine 64. In this way, all three sections of the pipe 62 are aligned within a single plane, i.e., co-planer. At this point, the leveling tool 20 may be easily removed from the pipe 62 by simply pulling it off of the pipe.

The leveling tool 20 may be used to help an operator make any number of bends along a workpiece, such as the offset bends just described, a saddle, multiple offsets and/or multiple saddles, and so forth. In addition, the leveling tool 20 may be used to help an operator make multiple bends in non co-planer configurations. Thus, the leveling tool 20 can be used too easily help an operator bend a workpiece, such as an electrical conduit, bar, pipe, or tube, in a desired orientation. Of course, the leveling tool 20 can also be used for other purposes, such as leveling a workpiece for installation, and the particular use of the leveling tool 20 is not limited by any of the particular exemplary uses described herein.

The foregoing detailed description is to be construed as exemplary only and does not describe every possible embodiment or arrangement of features. One could implement numerous alternate embodiments, using either current technology or technology developed after the filing date of this application. Thus, while specific exemplary forms are illustrated and described herein, it is to be understood that any of the various aspects, arrangements, and/or features disclosed herein may be combined with any one or more of the other aspects, arrangements, and/or features disclosed herein in a manner that would be understood by a person of ordinary skill in view of the teachings of this disclosure.

I claim:

1. A leveling tool configured to be releasably attached to a pipe, the leveling tool comprising:
   a level carried by a main body;
   a first articulating arm extending from the main body;
   a second articulating arm extending from the main body;
   a first magnet carried by the first articulating arm; and
   a second magnet carried by the second articulating arm;
   wherein each of the first articulating arm and the second articulating arm articulate so as to be able to wrap at least part way around a pipe, and the first and second magnets are configured to releasably attach the first and second arms to the pipe.

2. The leveling tool of claim 1, wherein the first articulating arm is joined to the main body at a first articulating joint.

3. The leveling tool of claim 2, wherein the second articulating arm is joined to the main body at a second articulating joint.

4. The leveling tool of claim 1, wherein the magnet is disposed on a bottom surface of the first arm.

5. The leveling tool of claim 1, further comprising:
   a third magnet carried by the main body, the third magnet configured to releasably couple the main body to a pipe.

6. The leveling tool of claim 1, wherein the level comprises a bubble level.

7. The leveling tool of claim 6, wherein the bubble level extends along an axis away from a top surface of the main body.

8. The leveling tool of claim 3, wherein the first articulating arm further comprises a plurality of links articulatingly joined together, including at least a first intermediate link articulatingly joined to the main body at the first joint and a first end link.

9. The leveling tool of claim 8, wherein the first magnet is carried by the first intermediate link, and a fourth magnet is carried by the first end link.

10. The leveling tool of claim 8, wherein the first end link is articulatingly joined to the first intermediate link at a third joint.

11. The leveling tool of claim 8, wherein the second arm further comprises a plurality of links articulatingly joined together, including at least a second intermediate link articulatingly joined to the main body at the first joint and a second end link.

12. The leveling tool of claim 11, wherein the second magnet is carried by the second intermediate link, and a fifth magnet is carried by the second end link.

13. The leveling tool of claim 11, wherein the second end link is articulatingly joined to the second intermediate link at a fourth joint.

14. The leveling tool of claim 1, further comprising a look-through protective cover carried by the main body, wherein the look-through protective cover at least partly surrounds and protects the level.

15. The leveling tool of claim 14, wherein the look-through protective cover comprises a cage defining at least one side window through which the level is visible.

16. A leveling tool, comprising:
   a main body;
   a level carried by the main body,
   a first articulating arm extending from the body in a first direction, the first articulating arm comprising a first intermediate link connected to the main body by a first articulating joint and a first end link;

a second articulating arm extending from the body in a second direction, the second articulating arm comprising a second intermediate link connected to the main body by a first articulating joint and a second end link;

a first magnet carried by the first articulating arm;

a second magnet carried by the second articulating arm; and a third magnet carried by the main body.

17. The leveling tool of claim 16, wherein the level comprises a bubble level.

18. The leveling tool of claim 17, wherein the first end link is connected to the first intermediate link with third articulating joint, and the second end link is connected to the second intermediate link with a fourth articulating joint.

* * * * *